Patented Nov. 16, 1937

2,099,091

UNITED STATES PATENT OFFICE 2,099,091

PRINTING AND DYEING COMPOSITIONS AND PROCESSES

Frithjof Zwilgmeyer, Wilmington, Del., assignor to E. I. du Pont de Nemours & Company, Wilmington, Del., a corporation of Delaware No Drawing. Application October 10, 1935, Serial No. 44,329

20 Claims. (Cl. 8—5)

A. This invention relates to new compositions of matter and to dyeing. More particularly the invention relates to new compositions of matter including azo dyes, and to processes of employing them, particularly in printing processes. The invention will be described with reference to particular examples which are illustrative but not limitative thereof.

B. The azo dyes are a well-defined group containing the chromophor —N=N—. The chromogen of azo dyestuffs comprises two aryl radicals with the chromophor between them. The monoazo dyes are generally prepared by joining two components of which the first, an amine, is called the azo component, and the second, usually a phenol, an amine, or an active methylene compound, is called the coupling component. In coupling the components, the azo component is diazotized, and is reacted with the second component, usually in solution.

C. The azo dyes of the prior art are applied by one of several processes that have been devised to take advantage of the nature of particular dyes: (a) The dyestuff is dissolved or dispersed in a suitable liquid medium and the material to be dyed is dipped therein. Satisfactory results are obtained by this method only if the completed dyestuff is substantive to the material which is to be dyed. (b) A substantive coupling component, or a substantive azo component, is directly affixed to the material, and the diazotized component or the coupling component, respectively, is coupled thereto, completing the dye on the material. (c) An azo component is diazotized and coupled to a compound with which it forms a new compound stable in alkaline or neutral medium, and is mixed with the coupling component and with the other ingredients of a basic or neutral printing paste, or solution. The material to be dyed is impregnated with the paste, or with the solution, by printing or in any other satisfactory manner and the dye is formed on the material by reaction with an acid, whereby it is freed and enabled to react with the coupling component. This invention relates to new compositions of matter to be applied by the third of these methods, and to processes of applying them.

D. It is an object of the invention to prepare new compositions of matter suitable for the printing of textile fibers and other dyeable material. Another object of the invention is to prepare mixtures of stable, water-soluble diazoimino compounds and hydroxy-arylamines. Other objects of the invention are to produce new compositions of matter suitable for dyeing, and new processes of applying them.

E. The objects of the invention are attained, generally speaking, by stabilizing a diazotized primary arylamine by the formation of a diazoimino compound, and by mixing the diazoimino compounds with amino-naphthols having the formula:

in which X and Y are small integers, preferably 1 or 2. Other objects of the invention are attained by preparing the said mixtures as dry powders, as pastes, or in solution, and by incorporating them in printing pastes and other dyeing compositions. The objects of the invention are accomplished, in one specific modification, by impregnating a fabric, or a fibrous material, with a basic or neutral paste containing a mixture of the stabilized azo component and the coupling component, and exposing the impregnated material, preferably at elevated temperature to the action of a preferably mild acid. Still other objects of the invention are accomplished by the processes of applying the new compositions of matter more fully hereinafter set forth.

F. In the practice of the preferred form of the invention the azo component, a diazotized primary arylamine, is coupled with a stabilizing agent, for instance piperidine-alpha-carboxylic acid, forming a compound stable in alkaline or neutral media, and is mixed with an amino naphthol coupling component. The mixtures may be in the form of dry powders, in the form of pastes, or in the form of solutions and, although the processes of using them will differ somewhat according to the state of the ingredients, the general method will be to impregnate the colorable material with the mixture, and to act upon it with enough acid to regenerate the diazo component and permit it to react with the coupling component.

G. In the form of the invention which involves the dyeing of a cloth by the so-called process of printing, the azo component, diazotized and stabilized as hereinabove described, is mixed in a basic paste with the coupling component, the paste is applied to an etched or "printing" roller which impregnates the fabric by contact, the fabric is placed in a closed container, and is subjected for a few seconds, at elevated temperature and usually in the presence of water vapor, to the action of the fumes of an acid which neutralizes the basicity of the paste, breaks up the stabilized complex, and frees the azo component for reaction with the coupling component.

H. The azo components may advantageously include as substituents in the aryl nucleus from one to five of the group alkyl, alkoxy, halogen, aryloxy, aralkyl, aralkoxy, aryl, hydroaryloxy, and trifluoro-alkyl, but generally speaking satisfactory results are obtained by the use of azo components having from one to three of these substituents. Illustrative of the general utility as azo components of the primary arylamines are the following:

Ortho-chloro-aniline
2:5-dichloro-aniline
4-chloro-2-amino-phenetol
Ortho anisidine
4-chloro-2:5-dimethyl-aniline
4-benzoyl-amino-2:5-dimethoxy-aniline
5-nitro-2-amino-anisole
1-methoxy-2-naphthylamine
4-chloro-2-amino-diphenyl-ether
Meta-amino-benzo-trifluoride
Ortho-amino-azo-toluene
4:4'-diamino-diphenylamine
3-amino-carbazole.

This list is exemplary, not limitative.

I. The coupling components used in my invention may have the nuclear substituent groups recited in Paragraph H in numbers up to the limit of capacity, but those having no or a low number of substituents produce such excellent colors that it is usual to employ them. The following are exemplary, but not limitative, of the class of satisfactory coupling components:

2:4-dihydroxy-1-naphthylamine
4:8-dihydroxy-1-naphthylamine
2-amino-7-naphthol
2-amino-8-naphthol
1-amino-4-naphthol
2-amino-3-naphthol.

J. Any of the usual stabilizing agents may be used in the preparation of water-soluble diazoimino compounds. The following are exemplary, but not limitative, of the class:

Sarcosin
1-methyl-amino-ethane-2-sulfonic-acid
Proline
Nipecotinic-acid
Benzylene-imine-para-sulfonic-acid
1-naphthylamine-2:4:8-trisulfonic-acid
2-ethyl-amino-4-sulfo-benzoic-acid.

Examples of other derivatives of diazotized arylamines which are inactive toward coupling components under alkaline conditions, but which revert to the diazo form when reacted upon by acids, are for instance the so-called nitrosamines and azo-sulfonates.

K. The following examples, in which parts are by weight, are designed to illustrate but not to limit the various features of the invention:

*Example I*

A diazoimino compound, stable under basic or neutral conditions in the presence of azo dyestuff coupling components, was made by reacting diazotized 4-chloro-2-amino-anisole with piperidine alpha-carboxylic acid. 83 parts of the stabilized diazoimino compound were ground with 17 parts of 1-amino-7-naphthol, producing a light tan powder. A printing paste was prepared by thoroughly mixing the following ingredients in the proportions by weight set down:

6 parts of mixed color components obtained as above described
6 parts of ethylene-glycol-mono-ethyl-ether
21 parts of water
2 parts of 25% sodium hydroxide aqueous solution
65 parts of starch-gum tragacanth thinner.

Cotton piece goods were printed with the above paste, from an engraved copper roll, and dried. The dry prints were exposed for two minutes to the vapors from a boiling 5% acetic-acid aqueous solution. The developed prints were rinsed with water, soaped, again rinsed, and dried. The print was developed to a brown shade of good fastness properties. The exact constitution of the produced dyestuff not being known, no formula therefor is given, but the dyestuff is claimed as new.

*Example II*

A water-soluble diazoimino compound was obtained by reacting diazotized 4-chloro-2-amino-toluene with piperidine-alpha-carboxylic acid. 80 parts of this diazoimino compound were mixed with 20 parts of 1:7-amino-naphthol. A printing paste was prepared as in Example I and cotton piece goods were printed by the procedure described in Example I. The printed pattern was developed to a brown shade of good fastness. The exact constitution of the produced dyestuff not being known, no formula therefor is given, but the dyestuff is claimed as new.

*Example III*

A water-soluble diazoimino compound was prepared by reacting diazotized 4-chloro-2-amino-anisole with piperidine-alpha-carboxylic acid. 75 parts were intimately mixed by grinding with 15 parts of 1:5-amino-naphthol and 10 parts of sugar. A printing paste was prepared as in Example I. Cotton goods were printed therewith and the color was developed as described above. It was a brown shade of good fastness. The exact constitution of the produced dyestuff not being known, no formula therefor is given, but the dyestuff is claimed as new.

*Example IV*

36 parts of 1:7-amino-naphthol ground to a fine powder with 54 parts of water-soluble diazoimino compound prepared by reacting tetrazotized dianisidine on methyl glucamine

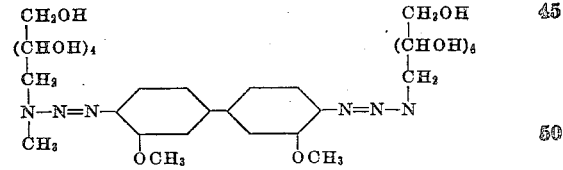

and diluted with 10 parts of ground cane sugar.

A printing paste was prepared as in Example I. Cotton goods were printed and the color was developed as in Example I. The color was developed as a black of good fastness. The exact constitution of the produced dyestuff not being known, no formula therefor is given, but the dyestuff is claimed as new.

*Example V*

30 parts of the diazoimino compound prepared as in Example IV were mixed with 30 parts of the anilide of 2:3-hydroxynaphthoic acid and 40 parts of cane sugar. 20 parts of this mixture were incorporated with 80 parts of the mixture obtained in Example IV and from this mixture a printing paste was prepared as in Example I. Cotton piece goods were printed with the paste and the color was developed in the manner above described as a black of good fastness and high tinctorial value. The exact constitution of the produced dyestuff not being known, no formula therefor is given, but the dyestuff is claimed as new.

L. In the following examples are listed additional mixtures suitable for dyeing by the processes herein described:

| Example No. | Parts | Diazoimino component | Parts | Coupling component | Shade produced |
|---|---|---|---|---|---|
| 6 | 83 | Water-soluble diazoimino component obtained by the action of diazotized 4-chloro-2-amino-anisole on methyl-glucamine of the formula:<br>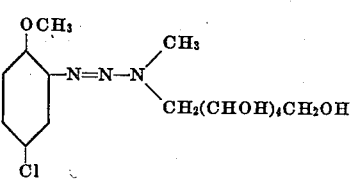 | 17 | 1:7-amino-naphthol | Dark brown |
| 7 | 67 | Water-soluble diazoimino compound of 4-chloro-2-amino-toulene-piperidine-alpha-carboxylic acid. | 33 | 1:5-amino-naphthol | Dark brown |
| 8 | 67 | Water-soluble diazoimino compound of 4-chloro-2-amino-anisole-piperidine-alpha-carboxylic acid. | 33 | 1:5-amino-naphthol | Dark brown |

Example IX

A printing paste of 1:7-amino-naphthol with a nitrosamine was prepared according to the following formula:

- 2.4 parts of nitrosamine from 4-chloro-2-amino-anisole of 42% strength
- 0.6 part of 1:7-amino-naphthol
- 3.0 parts of caustic soda 35%
- 24.0 parts of water
- 70.0 parts of starch tragacanth thickener 100.0

Cotton piece goods were printed with the above paste from an engraved copper roll, then dried. The dry prints were subjected to the vapors from boiling 5% acetic-acid solution, for a period of two and a half minutes.

The developed prints were twice rinsed with water and dried. The print was dyed a brown shade of good fastness properties.

M. The examples herein illustrate the compositions in the form of dry powders, but the compositions may be produced with equal facility in pastes or solutions containing water or other satisfactory solvent liquids. They may, for instance, be dissolved in solutions of water, or in water mixed with ethyl alcohol, cellosolve, ethanolamine, and the like. These solutions must, of course, be neutral or alkaline until the time comes for coupling the two components of the dye.

N. The examples illustrate only the printing of textile fibers by these compositions. It will be understood, however, that any other method of impregnating the fibers may be used. For instance, the new compositions may be dissolved or suspended in a liquid medium, and pigments produced by treating with acids under suitable conditions of temperature and concentration.

O. The invention is applicable to the dyeing of cotton, regenerated cellulose, cellulose esters and ethers and, with somewhat less satisfactory results, to the dyeing of wool, silk, and leather.

P. This new class of compositions and the new

| Example No. | Parts | Diazoimino component | Parts | Coupling component | Shade produced |
|---|---|---|---|---|---|
| 10 | 81 | Water-soluble diazoimino compound of the formula:<br>[structure with $OC_2H_5$, $CH_3OCO\,NH$-, $OC_2H_5$, $-N=N-N(CH_3)CH_2(CHOH)_4CH_2OH$]<br>obtained by the action of diazotized 4-carbo-methoxy-amino-2:5-diethoxy-aniline on methyl-glucamine. | 19 | 1:7-amino naphthol | Black |
| 11 | 83 | Water-soluble diazoimino compound of 4-chloro-2-amino-anisole-piperidine-alpha-carboxylic acid. | 17 | 1:6-amino-naphthol | Dark brown |
| 12 | 81 | Water-soluble diazoimino compound of the formula:<br>[structure with $OC_2H_5$, $CH_3OCO\,NH$-, $OC_2H_5$, $-N=N-N(CH_3)CH_2(CHOH)_4CH_2OH$] | 19 | 1:6-amino-naphthol | Black |
| 13 | 83 | Water-soluble diazoimino compound of 4-chloro-2-amino-anisole-piperidine-alpha-carboxylic acid. | 17 | 2:6-amino-naphthol | Brown |
| 14 | 83 | Water-soluble diazoimino compound of 4-chloro-2-amino-anisole-piperidine-alpha-carboxylic acid. | 17 | 2:1-amino-naphthol | Brown |
| 15 | 83 | Water-soluble diazoimino compound of 4-chloro-2-amino-anisole-piperidine-alpha-carboxylic acid. | 17 | 1:2-amino-naphthol | Brown |
| 16 | 83 | Water-soluble diazoimino compound of 4-chloro-2-amino-anisole-piperidine-alpha-carboxylic acid. | 17 | 1:8-amino-naphthol | Brown | process make possible the dyeing and printing of suitable materials in very dark brown and black shades by the recently developed one-bath process, for which heretofore no products were available. The new compositions are readily manufactured at a reasonable cost, and produce colors of satisfactory fastness.

Q. As many apparently widely different embodiments of this invention may be made without departing from the spirit and scope thereof, it is to be understood that I do not limit myself to the specific embodiments thereof except as defined in the appended claims.

I claim:

1. The method which comprises grinding 83 parts of 4-chloro-2-amino-anisole-piperidine-alpha-carboxylic acid with 17 parts of 1-amino-7-naphthol under neutral or basic conditions, incorporating in a paste containing 6 parts thereof, 6 parts mono-ethyl-ether of ethylene glycol, 21 parts water, 2 parts of 25% sodium hydroxide aqueous solution, and 65 parts of starch-gum tragacanth thinner, printing cotton cloth with said paste, drying the print, and exposing it for two minutes to the vapors of a boiling 5% acetic acid solution, washing the print and drying it.

2. The method which comprises grinding 4-chloro-2-amino-anisole-piperidine-alpha-carboxylic acid with 1-amino-7-naphthol under neutral or basic conditions, incorporating the mixture in a paste containing a solvent, water, 25% sodium hydroxide aqueous solution, starch-gum tragacanth thinner, impregnating cotton cloth with said paste, drying it, exposing it to dilute acetic acid vapors, and washing the print.

3. The method which comprises mixing 4-chloro-2-amino-anisole-piperidine-alpha-carboxylic acid with 1-amino-7-naphthol under neutral or basic conditions, incorporating said mixture in a non-acid printing composition, impregnating the material to be dyed therewith, and acting upon it with acid vapors until the base is neutralized and the color formed.

4. The method which comprises mixing the diazoimino compound, of a diazotized primary arylamine free from water-solubilizing groups, in a non-acid medium with an hydroxy arylamine of the naphthalene series represented by the formula:

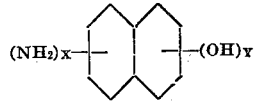

in which X and Y are each 1 or 2, impregnating a material therewith, and acting thereupon with acid until the color is formed.

5. The method which comprises grinding 54 parts of a diazoimino compound of dianisidine stable in non-acid medium with 36 parts of 1:7-amino-naphthol under non-acid conditions, incorporating 6 parts of the product in a mixture containing 6 parts mono-ethyl-ether of ethylene glycol, 21 parts water, 2 parts 25% sodium hydroxide aqueous solution, 65 parts gum-tragacanth thinner, printing cotton cloth therewith, drying the print, exposing it for two minutes to acetic acid vapors, and washing and drying.

6. The method which comprises mixing 54 parts of a diazoimino compound of dianisidine stable in non-acid medium with 36 parts of 1:7-amino-naphthol under non-acid conditions, incorporating the product in a printing composition, impregnating material therewith and developing the color with acid.

7. The method which comprises mixing a diazoimino compound of dianisidine with an amino-naphthol under non-acid conditions, impregnating a material therewith, and developing the color with acid.

8. The method which comprises mixing 83 parts of 4-chloro-2-diazoimino-anisole-piperidine-alpha-carboxylic acid with 17 parts of 1-amino-7-naphthol under non-acid conditions.

9. The method which comprises mixing 54 parts of the diazoimino compound of tetrazotized dianisidine with 36 parts of 1-amino-7-naphthol under non-acid conditions.

10. A composition of matter comprising 17 parts of 1-amino-7-naphthol and 83 parts of the compound represented by the formula

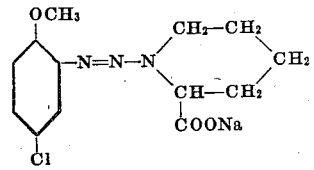

11. A composition of matter comprising a mixture of a compound represented by the formula

in which aryl is of the naphthalene series, and X and Y are each 1 or 2, with a compound represented by the formula

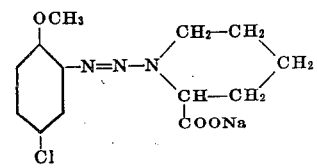

12. A composition of matter comprising 36 parts of 1:7-amino-naphthol mixed with 54 parts of methyl glucamine stabilized, diazotized dianisidine.

13. A composition of matter which comprises tetrazotized dianisidine stabilized with methyl glucamine and mixed with an amino-naphthol.

14. A dyestuff being substantially identical with the product formed by mixing in the proportions stated the following ingredients 17 parts of 1-amino-7-naphthol and 83 parts of 3-chloro-6-methoxy-aniline coupled to piperidine-alpha-carboxylic acid under conditions favoring the split-up of the diazoimino compound and the coupling of the azo and coupling components.

15. An azo dyestuff being substantially identical with the product formed by reacting in the proportions stated the following ingredients 36 parts of 1:7-amino-naphthol, 54 parts of a diazoimino compound obtained by reacting diazotized dianisidine with methyl glucamine.

16. Material of fibrous organic origin dyed with the compound formed by coupling the diazo compound from 83 parts of 4-chloro-2-amino-anisole-piperidine-alpha-carboxylic acid with 17 parts of 1-amino-7-naphthol on the surface thereof.

17. Material of fibrous organic origin dyed with the compound formed by coupling the diazo compound from 80 parts of 4-chloro-2-amino-toluene-piperidine-alpha-carboxylic acid with 20 parts of 1:7-amino-naphthol on the surface thereof.

18. Material of fibrous organic origin dyed with a dye formed by coupling the diazo compound from 54 parts of tetrazotized-dianisidine-methylglucamine and 36 parts of 1:7-amino-naphthol on the surface thereof.

19. Material of fibrous organic origin dyed with a dyestuff formed by coupling on the surface thereof a diazotized primary arylamine with an hydroxy-arylamine represented by the formula:

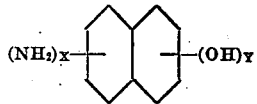

in which X and Y are each 1 or 2.

20. Material of fibrous organic origin dyed with a dye formed by coupling on the surface thereof a diazotized primary arylamine and a compound represented by the formula:

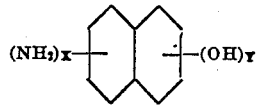

in which X and Y are each small integers.

FRITHJOF ZWILGMEYER.